US009629505B2

(12) United States Patent
Johnson

(10) Patent No.: US 9,629,505 B2
(45) Date of Patent: Apr. 25, 2017

(54) FOOD CONTAINER ORGANIZER

(71) Applicant: Douglas S. Johnson, Huntington Beach, CA (US)

(72) Inventor: Douglas S. Johnson, Huntington Beach, CA (US)

(*) Notice: Subject to any disclaimer, the term of this patent is extended or adjusted under 35 U.S.C. 154(b) by 60 days.

(21) Appl. No.: 14/727,232

(22) Filed: Jun. 1, 2015

(65) Prior Publication Data
US 2016/0345784 A1 Dec. 1, 2016

(51) Int. Cl.
A47J 47/16 (2006.01)
A47F 7/28 (2006.01)
A47B 81/04 (2006.01)
A47F 7/00 (2006.01)

(52) U.S. Cl.
CPC ............. *A47J 47/16* (2013.01); *A47B 81/04* (2013.01); *A47F 7/0064* (2013.01); *A47F 7/281* (2013.01)

(58) Field of Classification Search
CPC ...... A47F 7/0064; A47F 7/281; A47F 7/0007; A47J 47/16; A47B 81/04; A47L 19/00; A47L 19/02; A47L 19/04
See application file for complete search history.

(56) References Cited

U.S. PATENT DOCUMENTS

| 2,094,810 | A | * | 10/1937 | Oppenheimer | ........... A47F 7/06 211/166 |
| D118,029 | S | * | 12/1939 | Webb | .................. D6/682.6 |
| D182,742 | S | * | 5/1958 | Rennels | ................... D7/546 |
| 2,936,898 | A | * | 5/1960 | Miguez | ............. A47L 19/04 211/41.3 |
| 2,957,585 | A | * | 10/1960 | Berlener | .............. B01L 9/00 211/74 |
| 4,364,480 | A | * | 12/1982 | Ohno | ............. A47G 23/0208 211/105 |
| 4,448,312 | A | * | 5/1984 | Schuman | ........... A47G 23/06 108/25 |
| D297,192 | S | * | 8/1988 | Mixon | .................. D6/682.6 |
| 4,919,278 | A | * | 4/1990 | Howen | ............. A47J 47/16 206/515 |
| D314,476 | S | * | 2/1991 | Behrman | ............ D6/682.6 |

(Continued)

FOREIGN PATENT DOCUMENTS

| DE | FR 403288 A | * | 10/1909 | ......... A47L 19/04 |
| DE | 202012101042 U1 | * | 6/2012 | ......... A47J 47/16 |
| DE | 202013005953 U1 | * | 8/2013 | ......... B60R 11/00 |

*Primary Examiner* — Stanton L Krycinski
(74) *Attorney, Agent, or Firm* — Morland C. Fischer

(57) ABSTRACT

A compact food container organizer by which variously sized food containers and their lids are stored and sorted in a neat and orderly manner. The organizer has a plurality of upstanding pedestals attached to a flat support base. At least some of the pedestals have respective disk-shaped end caps detachably connected to and removable from the tops thereof. The lengths of the upstanding pedestals above the support base and the diameters of the disk-shaped end caps vary so that stacks of different food containers can first be inverted and then positioned over correspondingly sized pedestals so that the bottoms of the containers are seated on opposing end caps connected to the pedestals. A plurality of lid baskets having different sizes are attached to the support base to accommodate therewithin lids of different sizes that cover the food containers.

7 Claims, 2 Drawing Sheets

(56) References Cited

U.S. PATENT DOCUMENTS

| | | | | |
|---|---|---|---|---|
| D322,344 S | * | 12/1991 | Winkler | D32/58 |
| 5,109,990 A | * | 5/1992 | Murphy | A47J 47/20 |
| | | | | 211/41.3 |
| 5,188,244 A | * | 2/1993 | Hollstegge | D06F 59/00 |
| | | | | 211/13.1 |
| D342,191 S | * | 12/1993 | Cronk | D7/706 |
| D346,312 S | * | 4/1994 | Spiersch | D32/58 |
| D351,745 S | * | 10/1994 | Seifert | D6/682.6 |
| 5,392,923 A | * | 2/1995 | Hassard | A47F 10/00 |
| | | | | 108/96 |
| 5,492,237 A | * | 2/1996 | Chang | A47L 19/04 |
| | | | | 211/118 |
| D370,323 S | * | 5/1996 | Lafond | D32/55 |
| D376,559 S | * | 12/1996 | Elsea | D11/147 |
| D383,607 S | * | 9/1997 | Whitlock | D3/305 |
| 5,943,786 A | * | 8/1999 | Stahley | F26B 21/006 |
| | | | | 211/41.3 |
| 6,012,687 A | * | 1/2000 | Head | B65B 67/1238 |
| | | | | 248/100 |
| 6,125,548 A | * | 10/2000 | Dunn | F26B 25/18 |
| | | | | 211/41.6 |
| D460,295 S | * | 7/2002 | Fissell | D32/58 |
| 6,675,493 B1 | * | 1/2004 | Martin | F26B 25/18 |
| | | | | 248/95 |
| D488,603 S | * | 4/2004 | Bardenhagen-Shuster | D32/58 |
| D490,198 S | * | 5/2004 | Jerstroem | D32/55 |
| 6,769,538 B2 | * | 8/2004 | Oswald | A47G 29/08 |
| | | | | 206/457 |
| D538,066 S | * | 3/2007 | Wagner | D6/681.1 |
| D561,541 S | * | 2/2008 | Stephen | D7/707 |
| 7,458,470 B2 | * | 12/2008 | Jerstroem | A47L 19/04 |
| | | | | 211/41.4 |
| D599,519 S | * | 9/2009 | Cohen | D32/55 |
| D603,657 S | * | 11/2009 | Tu | D7/622 |
| D610,265 S | * | 2/2010 | Lea | D24/227 |
| D634,909 S | * | 3/2011 | Guthrie | D32/55 |
| D680,394 S | * | 4/2013 | Mirza | D7/707 |
| D684,330 S | * | 6/2013 | Ward | D32/58 |
| D701,715 S | * | 4/2014 | Musheyev | D6/682.6 |
| D723,759 S | * | 3/2015 | Evans | D32/55 |
| 2007/0262038 A1 | * | 11/2007 | Harbison | A47F 5/0807 |
| | | | | 211/162 |
| 2008/0136301 A1 | * | 6/2008 | Harbison | A47J 47/16 |
| | | | | 312/334.1 |
| 2008/0223801 A1 | * | 9/2008 | Krempa | A47B 75/00 |
| | | | | 211/71.01 |

* cited by examiner

FOOD CONTAINER ORGANIZER

BACKGROUND OF THE INVENTION

1. Field of the Invention

This invention relates to a food container organizer having pluralities of variously-sized upstanding pedestals and lid baskets mounted on a flat support base by which corresponding pluralities of variously-sized food containers and their lids are efficiently stored and sorted by size. By virtue of the organizer herein disclosed, the food containers and the lids can be grouped in an orderly, neat and compact arrangement to enable convenient and selective access thereto on an as-needed basis.

2. Background Art

Non-breakable food containers have long been used in which to store, refrigerate and transport a variety of food items. A lid is commonly associated with each food container. The food containers and their lids are manufactured in a variety of sizes to accommodate correspondingly different volumes and types of food.

When the food containers are not being used, it is preferable to store them in an out-of-the-way location in a kitchen or a similar facility until they are needed. Where many food container and lids must be stored prior to their use (such as in the case of a residential kitchen or a larger large food distribution center), a large amount of space is often consumed. Moreover, the random storage of a large number of individual food containers having different sizes may be disorganized and inconvenient especially in the case where a food container and its matching lid having a particular size must be quickly located among many other containers.

Therefore, what would be desirable is an efficient food container organizer for storing a variety of variously-sized food containers and their matching lids such that the containers and the lids can be grouped together according to their size in an orderly, neat and compact arrangement to enable convenient and selective access thereto on an as-needed basis.

SUMMARY OF THE INVENTION

In general terms, a compact food container organizer is disclosed by which stacks of variously-sized food containers and their lids are stored and sorted by size. The food container organizer includes a plurality of upstanding pedestals attached to a flat support base. Each of the pedestals has a different length above the support base. A corresponding plurality of (e.g., disk-shaped) interchangeable end caps are detachably connected to respective ones of the upstanding pedestals upon which the bottoms of inverted stacks of the round or rectangular food containers are seated. The end caps can be detached from their pedestals and replaced by end caps having different shapes and/or sizes. A plurality of lid baskets are attached to the flat base adjacent the upstanding pedestals. The lid baskets are preferably rectangular in shape and have different sizes to accommodate therewithin lids of different size that are used to cover the food containers.

The food container organizer enables a variety of food containers and their lids to be grouped according to their size in an orderly, neat and compact arrangement on the support base so as to be ideal for storage in a pull-out drawer or on a shelf of a pantry. More particular, stacks of identical food containers are first inverted and then laid over top the correspondingly sized end caps of the upstanding pedestals. Stacks of the lids for the containers are placed end-to-end one another in one of the lid baskets depending upon the size of the lids. Accordingly, convenient and selective access is available on an as-needed basis to any of the stacked food containers seated on the end caps of the pedestals and the container lids located within the lid baskets.

DESCRIPTION OF THE PREFERRED EMBODIMENT

Figure 1:
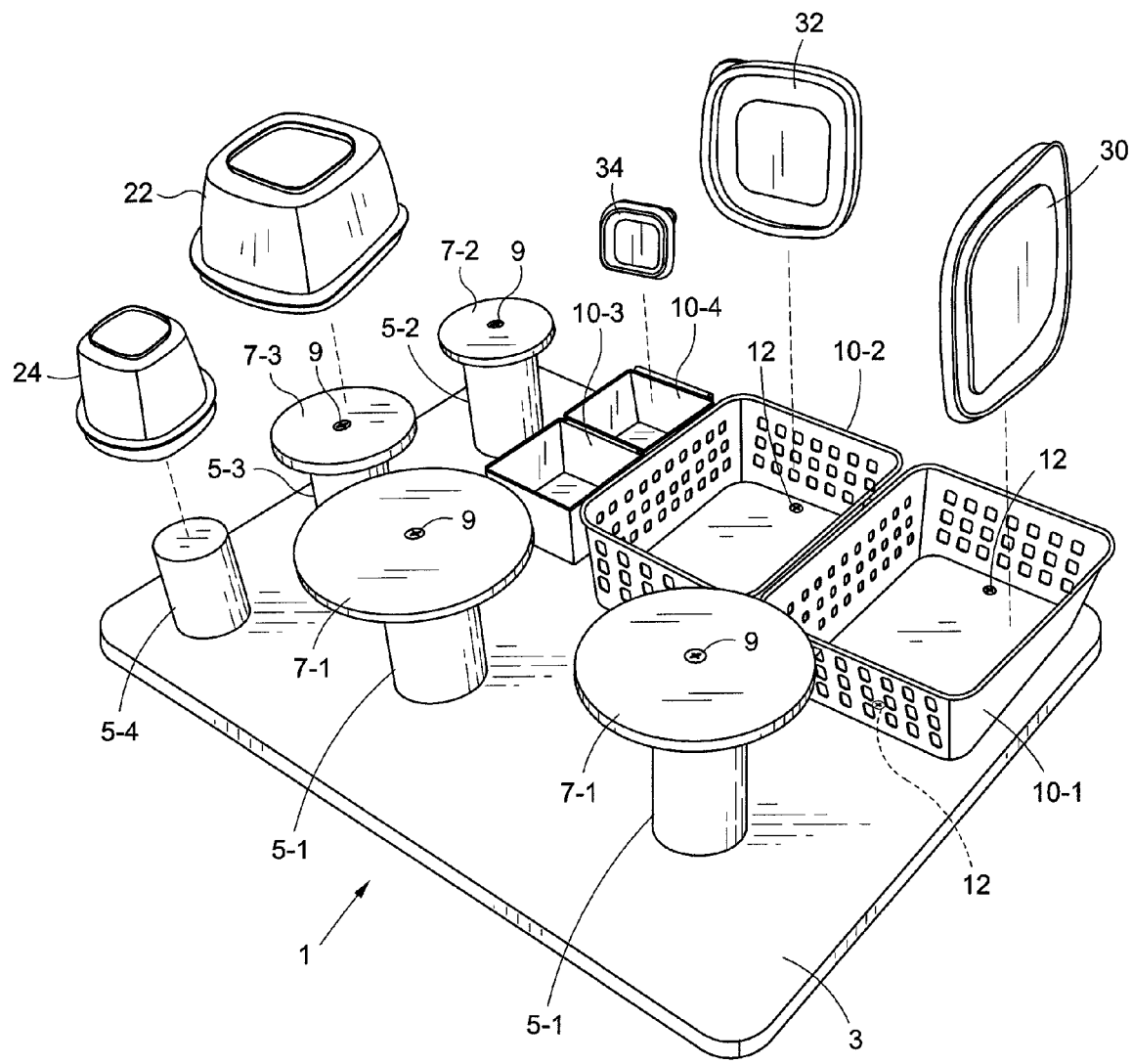
FIG. 1 is a perspective illustration of a compact food container organizer according to a preferred embodiment of this invention having variously sized upstanding pedestals and lid baskets mounted on a support base for holding and storing stacks of variously-sized food containers and their lids.
Figure 2:
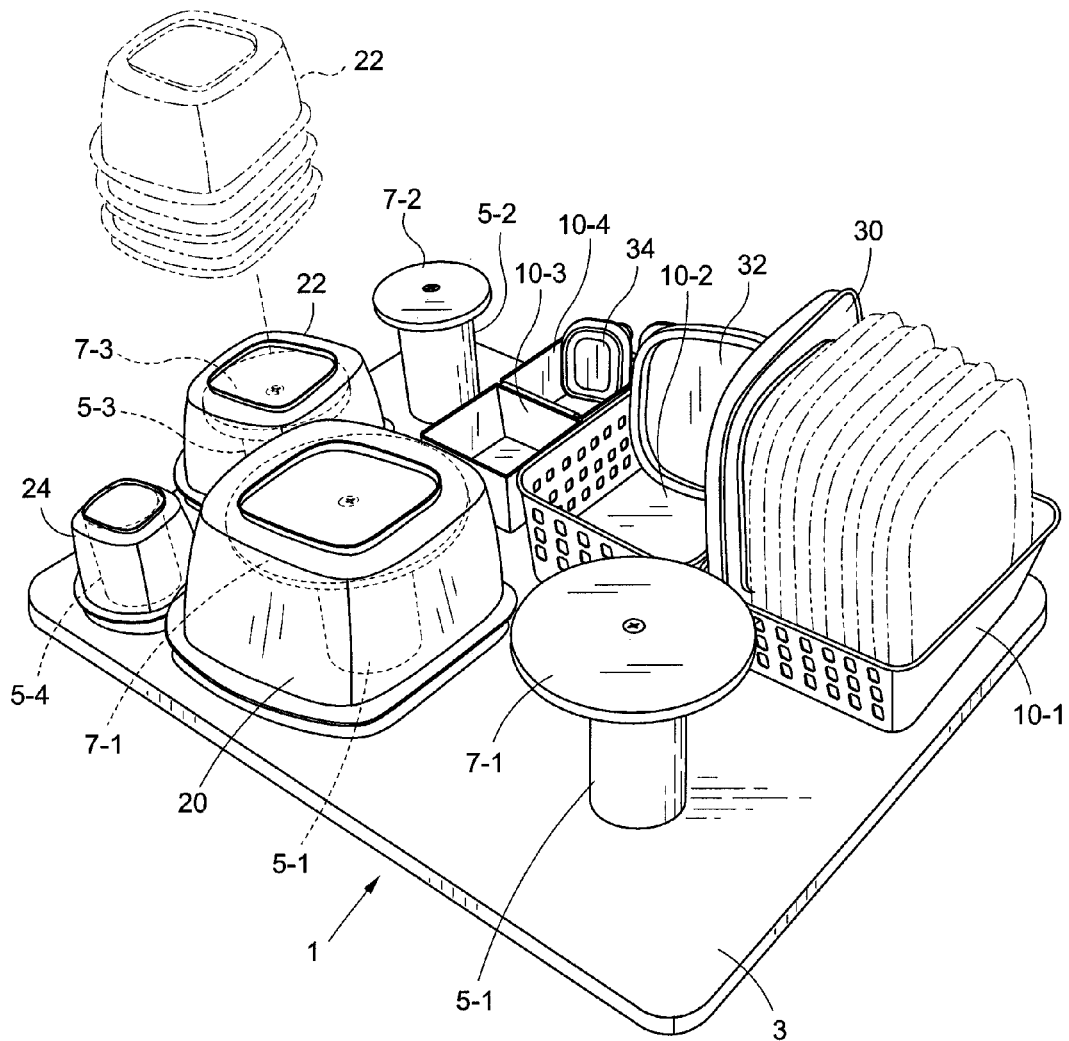
FIG. 2 shows the compact food organizer of FIG. 1 creating an orderly, neat and easily-manageable platform wherein inverted stacks of food containers are positioned over respective pedestals and stacks of lids are placed in lid baskets depending upon the sizes of the containers and their lids.

A preferred embodiment for a compact food container organizer 1 in accordance with the present invention is disclosed while referring concurrently to FIGS. 1 and 2 of the drawings. As will be explained hereinafter, the food container organizer 1 is particularly adapted to provide an orderly, neat and easily-manageable platform upon which to stack and sort a variety of different conventional food containers having a variety of different shapes. By way of example only, the food containers to be stacked and sorted on the organizer 1 are made from plastic and are commercially available from different manufacturers under the trademarks RUBBERMAID®, TUPPERWARE®, and others.

The food container organizer 1 includes a flat support base 3 that is preferably manufactured from a durable material such as acrylic or the like. The support base 3 is ideally sized to fit within a large pull-out drawer or on a shelf in a pantry so that the food containers being stacked on the organizer will be readily available to users.

A plurality of pedestals 5 stand upwardly from the support base 3. The pedestals 5 are connected to the support base 3 by means of fasteners (not shown) which run through the support base into the bottom of each pedestal. It is important that the pedestals 5 have different lengths relative to one another in order to provide support for food containers having different sizes. By way of example only, some of the upstanding pedestals 5-1 have a length of four inches above the support base 3. Other ones of the pedestals 5-2 have a length of three and one half inches. Still another pedestal 5-3 has a length of three inches, while a different pedestal 5-4 has a length of two inches.

Each of the upstanding pedestals 5 is preferably made from a durable acrylic material. While the pedestals 5 shown in the drawings have a cylindrical shape, it is to be understood that this shape is for purposes of example only, and the pedestals may have any other suitable shape over which a food container can be positioned.

Connected to the tops of at least some of the upstanding pedestals 5 of the organizer 1 are respective interchangeable end caps 7. However, at least one of the pedestals (e.g., the shortest pedestal designated 5-4) need have no end cap connected thereto. Like the pedestals 5, the end caps 7 have different sizes relative to one another in order to hold different food containers as will soon be explained. Although the particular shape of the end caps 7 is not to be considered a limitation of this invention, it is preferable that the end caps have a round disk shape. By virtue of a disk shape, the end caps 7 can conveniently receive and reliably hold both round and square shaped food containers that are positioned over the pedestals 5.

By way of example only, some of the disk-shaped end caps 7-1 (e.g., those connected to the longest pedestals 5-1) have a diameter of four and one half inches. Another end cap 7-2 connected to the pedestal 5-2 has a diameter of three and one half inches. A different end cap 7-2 connected to pedestal 5-3 has a diameter of three inches. As previously indicated, the shortest pedestal 5-4 has no end cap connected to the top thereof.

Each of the interchangeable end caps 7 is detachably connected to the top of a respective upstanding pedestal 5 by means of a removable fastener 9. That is, by removing one or more of the fasteners, one or more of the end caps 7 can be correspondingly detached from its pedestal 5. By virtue of the foregoing, any one of the end caps 7 can be replaced with a new end cap or interchanged with any other end cap according to the sizes and the number of the food containers to be stacked on the organizer 1.

Seated on top of the support base 3 adjacent the upstanding pedestals 5 are a plurality of lid baskets 10. The lid baskets 10 are preferably attached to the base 3 by means of fasteners 12 extending through the baskets and into the base. Like the upstanding pedestals 5 and the end caps 7 connected thereto, the baskets have different sizes relative to one to accommodate the lids which cover the food containers that are stacked on the organizer 1.

Each of the lid baskets 10 preferably has a rectangular shape to be able to receive a stack of both rectangular and/or round container lids. By way of example, a first pair of lid baskets 10-1 and 10-2 have an identical length of seven inches. The pair of lid baskets 10-1 and 10-2 may also have an identical (e.g., five inches) or a different width so that, and as will soon be described, the container lids may be stacked in different directions along the first pair of baskets 10-1 and 10-2 depending upon the sizes of the lids.

Each one of an identical second pair of lid baskets 10-3 and 10-4 has a square shape with each side thereof having a length of, for example, three inches. While a pair of identical lid baskets 10-3 and 10-4 is shown, only a single basket need be connected to the support base adjacent lid baskets 10-1 and 10-2. By virtue of the addition of small (relative to the size of the lid baskets 10-1 and 10-2) lid baskets 10-3 and 10-4, the organizer 1 will be advantageously capable of storing one or more stacks of correspondingly small container lids.

Use of the compact food container organizer 1 of this invention is now described for storing and sorting stacks of food containers and their lids while referring particularly to FIG. 2 of the drawings. A first stack of relatively large food containers 20 is shown inverted and positioned one on top of the other over the largest upstanding pedestal 5-1 so as to rest on the support base 3. The bottoms of the first stack of inverted containers 20 are seated upon the opposing end cap 7-1 which has the longest diameter and is connected to the pedestal 5-1. A second stack of smaller food containers 22 is inverted and positioned one on top of the other over a shorter one of the upstanding pedestals 5-3. The bottoms of the second stack of inverted containers 22 are seated upon the opposing end cap 7-3 connected to the pedestal 5-3. A third stack of the smallest food containers 24 is inverted and positioned one on top of the other over the shortest pedestal 5-4. In this case, the pedestal 5-4 has no end cap connected thereto. Therefore, the bottoms of the third stack of inverted containers 24 are located directly over top of and seated upon the opposing top of the pedestal 5-4.

A first stack of relatively large container lids 30 is shown stored within the largest lid basket 10-1 and held in upright side-by-side alignment with one another. The container lids 30 extend across the width of the basket 10-1. A second stack of smaller container lids 32 is also held in upright side-by-side alignment within the lid basket 10-2. In this case, the container lids 32 extend across the length of the basket 10-2. A stack of the smallest container lids 34 is held in upright side-by-side alignment within either one (or both) of the smallest lid baskets 10-3 or 10-4. The container lids 34 can extend across either the length or the width of the basket (e.g., 10-4).

Some or all of the upstanding pedestals 5 and the lid baskets 10 mounted to the support base 3 can be used for storage purposes depending upon the number and size of the food containers 20, 22 and 24 and their lids 30, 32 and 34 to be stacked within and sorted by the food container organizer 1. In this regard, it may be appreciated that both the containers and the lids are grouped according to their size in an orderly, neat and compact configuration to enable convenient and selective access thereto on an as-needed basis.

The invention claimed is:

1. A combination comprising:
a first food container having a bottom and a first size above said bottom;
a second food container having a bottom and a second size above said bottom, the size of said first food container being greater than the size of said second food container;
a first lid for said first food container;
a second lid for said second food container, said first lid being larger than said second lid; and
an organizer for storing and sorting said first and second food containers and said first and second lids therefor, said organizer comprising:
a base,
at least first and second pedestals attached to and standing upwardly from said base, said first and second pedestals having different lengths above said base so that the first food container having the first size can be positioned to lie over and surround said first pedestal such that the bottom of the first food container is seated on said first pedestal and the second food container having the second size can be positioned to lie over and surround said second pedestal such that the bottom of the second food container is seated on said second pedestal, and
at least first and second lid baskets attached to said base and having different sizes so as to accommodate respective ones of said first and second lids having different sizes.

2. The organizer recited in claim 1, further comprising a first end cap connected to the top of at least the first pedestal to create a seat on which the bottom of the first food container is seated when said first food container is positioned to lie over and surround said first pedestal.

3. The organizer recited in claim 2, wherein said first end cap is detachably connected to said first pedestal by a fastener extending through said end cap, said fastener being removable from said first end cap so that the end cap can be detached from said first pedestal and replaced by a different end cap.

4. The organizer recited in claim 2, wherein the first end cap connected to the top of said first pedestal is a disk having a first diameter.

5. The organizer recited in claim 4, further comprising a second end cap connected to the top of the second pedestal to create a seat on which the bottom of the second food container is seated when said second food container is positioned to lie over and surround said second pedestal.

6. The organizer recited in claim 5, wherein the second end cap connected to the top of said second pedestal is a disk having a second diameter, the length of said first pedestal and the diameter of said first end cap being greater than the length of said second pedestal and the diameter of said second end cap.

7. The organizer recited in claim 1, wherein each of said first and second lid baskets has a length and a width, one of the length or the width of said first lid basket being greater than the same one of the length or the width of said second lid basket.

\* \* \* \* \*